United States Patent
Jacob

(10) Patent No.: US 8,050,688 B2
(45) Date of Patent: Nov. 1, 2011

(54) METHOD AND APPARATUS FOR DELIVERING SERVICES

(75) Inventor: Kurian Jacob, Barrington, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1087 days.

(21) Appl. No.: 10/749,711

(22) Filed: Dec. 31, 2003

(65) Prior Publication Data

US 2005/0143095 A1    Jun. 30, 2005

(51) Int. Cl.
*H04W 24/00*    (2009.01)
(52) U.S. Cl. ............... 455/456.1; 455/456.3; 455/456.4; 455/456.6; 455/414.1; 455/435.2
(58) Field of Classification Search .............. 455/456.3, 455/456.1, 456.4, 435.3, 435.2, 422.1, 457, 455/456.6, 414.1
See application file for complete search history.

(56) References Cited

U.S. PATENT DOCUMENTS

| | | | |
|---|---|---|---|
| 5,929,848 | A | 7/1999 | Albukerk et al. |
| 6,161,182 | A * | 12/2000 | Nadooshan ................. 713/172 |
| 6,340,928 | B1 | 1/2002 | McCurdy |
| 6,640,097 | B2 * | 10/2003 | Corrigan et al. ........... 455/414.1 |
| 7,065,538 | B2 | 6/2006 | Aronoff et al. |
| 7,221,399 | B2 | 5/2007 | Fujita et al. |
| 7,433,678 | B2 | 10/2008 | Beckers |
| 7,907,896 | B2 | 3/2011 | Chitti |
| 2003/0064719 | A1 * | 4/2003 | Horne ......................... 455/423 |
| 2003/0109244 | A1 * | 6/2003 | Tendler ....................... 455/345 |
| 2003/0125963 | A1 * | 7/2003 | Haken ............................. 705/1 |
| 2003/0183690 | A1 * | 10/2003 | Yamagami ................... 235/380 |
| 2004/0002305 | A1 | 1/2004 | Byman-Kivivuori et al. |
| 2004/0014479 | A1 * | 1/2004 | Milman ....................... 455/457 |
| 2004/0054428 | A1 * | 3/2004 | Sheha et al. .................... 700/56 |
| 2004/0153357 | A1 * | 8/2004 | De Sylva ......................... 705/9 |
| 2004/0162064 | A1 * | 8/2004 | Himmelstein ............. 455/422.1 |
| 2004/0203638 | A1 * | 10/2004 | Chan et al. ................. 455/414.1 |
| 2004/0224702 | A1 * | 11/2004 | Chaskar .................... 455/456.3 |
| 2006/0182055 | A1 * | 8/2006 | Coffee et al. ................ 370/328 |
| 2007/0111662 | A1 | 5/2007 | Beckers et al. |
| 2008/0008304 | A1 * | 1/2008 | Deutsch et al. .......... 379/201.01 |

FOREIGN PATENT DOCUMENTS

WO    20050665897 A1    7/2005

\* cited by examiner

*Primary Examiner* — Ajit Patel
*Assistant Examiner* — Khai M Nguyen

(57) ABSTRACT

A user requests a service using a communication device (102) capable of providing information about the location of the user. The request is communicated by the communication device (102) along with information about the location of the user to a service provider agent (108) capable of dispatching a service provider (112) responsive to the service request. The service provider agent (108) may deliver to the user information relating to the manner in which the service will be rendered and information to facilitate payment for the service. This information may be provided by way of a token delivered to the user's communication device (102). Once the service is rendered, and the user is proximate the service provider (112), the service provider (112) and the communication device (102) exchange data to complete the service transaction, which may include information necessary to render the service and to affect payment for the service.

23 Claims, 2 Drawing Sheets

METHOD AND APPARATUS FOR DELIVERING SERVICES

TECHNICAL FIELD

This patent relates to delivery of services based upon services requests made via wireless communication technologies, and more particularly to methods and apparatus for requesting services and completing services transactions using wireless communications.

BACKGROUND

The availability of wireless communication devices, such as cellular telephones, paging devices, personal digital assistants, and the like allows users of such devices to order or request services from virtually any location in the world. For example, to order a transportation service, one may call a dispatcher for a given transportation service, notify the dispatcher of the location where the service is needed, i.e., the pickup location, the type of service requested, e.g., limo, taxi, etc., and the destination. The service provider, in this example the dispatcher, may retain a profile of its regular customers, which may include home address, business address, preferred manner of payment, preferred service type, etc. In all cases, the dispatcher must be informed of the pickup location. That is, even if the dispatcher knows the user's home or business address from the user's profile, it must be informed if the pickup is from the user's home or business or another location.

Once the order is placed with the dispatcher, in certain instances it is necessary to give the user instructions so that the service may be rendered. Continuing with the car service example outlined above, once the user has placed the order for a vehicle, the dispatcher will generally need to let the user know the car number, e.g., taxi/limousine number, license plate number, etc., so the user can identify the vehicle once it arrives. The user may require additional information, such as a location at an airport to wait for the vehicle to arrive.

When the service has been rendered, the user must pay for the service. While the user may pay with cash, the user may want to pay with a credit or debit card. Paying with a credit/debit card requires the vehicle driver to take information from the credit/debit card, either manually or by swiping the card in a reader; communicating the debit/credit card information to the dispatcher; obtaining an approval code from the dispatcher; and obtaining the users signature on a credit/debit card receipt. Completing the transaction may therefore delay the user.

DETAILED DESCRIPTION

Figure 1:
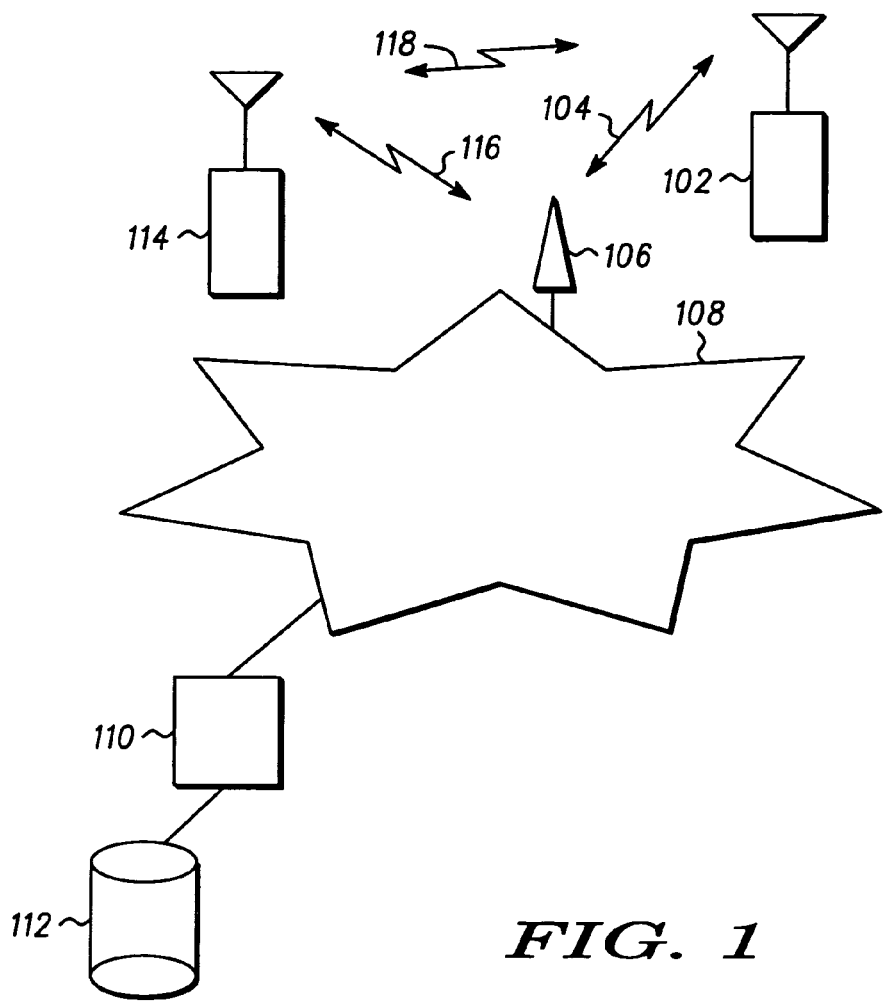
FIG. 1 is a graphic illustration of service rendering in accordance with a described embodiment.

A user requests a service using a communication device capable of providing information about the location of the user. The request is communicated by the communication device along with information about the location of the user to a service provider agent capable of dispatching a service provider responsive to the service request. The service provider agent may deliver to the user information relating to the manner in which the service will be rendered and information to facilitate payment for the service. This information may be provided by way of a token delivered to the user's communication device. Once the service is rendered, and the user is proximate the service provider, the service provider and the communication device exchange data to complete the service transaction, which may include information necessary to render the service and to affect payment for the service.

The user communication device may incorporate a processor, a transceiver, a service agent and a user interface. The user interface accepts input from the user regarding the requested service, and the processor in conjunction with the service agent formulates a service request that is communicated via the transceiver to a service provider agent. The processor, service component and transceiver are further operable to communicate service transaction data with a service provider responding to the service request.

In the example described below, the rendered service is transportation such as may be provided by a taxi or limousine company. This patent is not so limited in scope. One will appreciate that virtually any service wherein a service provider is dispatched to a location of the user to render the service and the service transaction is completed at the location where the service is rendered may be adapted to operate in accordance with the teachings of the present invention. For example, many types of services including food delivery services, automotive roadside services, equipment repair services may benefit from the teachings, herein.

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles may be implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Referring to FIG. 1, in a system 100 for rendering services a user uses a communication device 102 to request services via a communication infrastructure 104, a corresponding air interface 106 and a communication network 108. The communication network 108 may be any suitable network for communicating data, such as voice, text, graphics, multimedia and the like, and may be a local area network, a wide area network, the Internet, a circuit switched network, the public switch telephone network (PSTN) and the like. The air interface 106 may be specified in accordance with any suitable wireless communication protocol. These protocols may include the Global System for Mobile Communications (GSM), the Enhanced Data-rate for GSM Evolution (EDGE), the General Packet Radio Service (GPRS), the Universal Mobile Telecommunications System (UMTS), Frequency Division Multiple Access (FDMA), the IS-55 Time Division Multiple Access (TDMA) digital cellular, the IS-136 TDMA digital cellular, the IS-95 Code Division Multiple Access (CDMA) digital cellular, demand assignment schemes (DA/TDMA, DA/CDMA, DA/FDMA), the Wideband Code Division Multiple Access (WCDMA), CDMA 2000, IMT-2000, the Personal Communications System (PCS), 3GPP, as well as variations and evolutions of these protocols. Moreover, the communication device 102 and the communication infrastructure 104 may be adapted to operate in accordance with one or more of these protocols. These protocols, as is known, provide substantially seamless communication service to the user of the communication device 102 over a relatively large geographic area.

Included in the system 100 coupled to the communication network 108 is service provider agent 110 with a corresponding database 112. Also included in the system 100 is a service provider 114. The service provider 114, e.g., a taxi or limousine of a transportation service, may communicate with the network 108 via the communication infrastructure 106 and an air interface 116. Alternatively, the service provider 114 may communicate via a separate communication infrastructure, including without limitation, a group dispatch communication infrastructure. Moreover, while shown separately from the communication network 108, the service provider agent 110 may be part of the communication network 108 or any other suitable entity of the system 100.

The elements of the system 100 in FIG. 1 are known and available. The communication device 102 is available from manufacturers such as Motorola. The communication infrastructure 106 similarly is available from companies such as Motorola. The service provider agent 110 could be any standard off-the-shelf computer system designated for the particular purpose, from companies such as Sun, Hewlett Packard, or Dell and run using Windows, LINUX, UNIX or other suitable operating systems.

Figure 2:
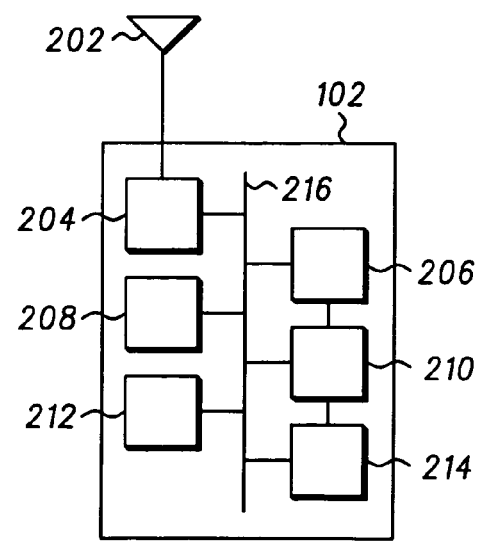
FIG. 2 is a block diagram illustration of a communication device to facilitate service rendering in accordance with a described embodiment.

Referring to FIG. 2, the communication device 102 may include an antenna 202, a transceiver 204, a processor 206, a memory 208, a location agent or module 210, a service agent 212 and a user interface 214 coupled via a communication bus 216. The antenna 202 and the transceiver 204 are adapted to wirelessly communicate data with and between the communication infrastructure 106 via the air interface 104 in accordance with one or more communication protocols, and as will be described, to communicate according to a second, peer-to-peer communication protocol for completing service transactions via a wireless interface 118. The memory 208 may contain one or more operating programs for directing the processor for controlling the transceiver 204. The operating program may also control operation of the processor for accepting from and presenting data to the user of the electronic device 100 via the user interface 212.

The location agent 210 may be based upon satellite positioning system technology and therefore may include a receiver and processor for determining position based upon signals received from a satellite network, such as the Global Positioning System (GPS) satellite network. Alternatively, the location module 210 may determine position of the communication device 102 based upon data or signals communicated to the communication device 102 by the communication infrastructure 106 or other sources. Alternatively, the location of the communication device 102 may be determined by the communication infrastructure 106 and reported to the communication device 102 on a periodic basis. There exists numerous techniques for determining the position of the communication device 102 within the system 100, several of which are well known to the person having ordinary skill in the art.

Figure 3:
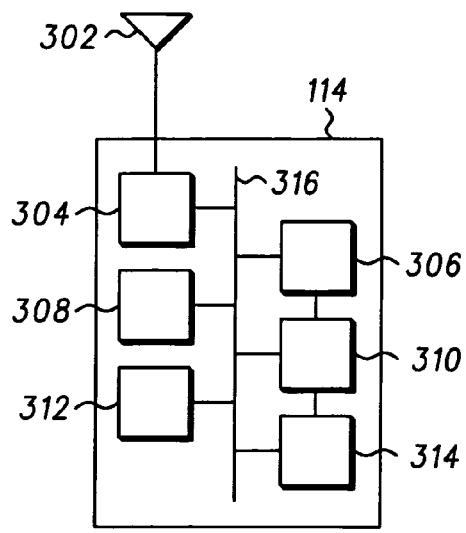
FIG. 3 is a block diagram illustration of a service provider to facilitate service rendering in accordance with a described embodiment.

Referring to FIG. 3, the service provider 114 may include an antenna 302, a transceiver 304, a processor 306, a memory 308, a location agent or module 310, a service agent 312 and a user interface 314 coupled via a communication bus 316. The antenna 302 and the transceiver 304 are adapted to wirelessly communicate data with and between the communication infrastructure 106 via the air interface 116 in accordance with one or more communication protocols, and as will be described to communicate according to the second, peer-to-peer communication protocol for completing service transactions via the wireless interface 118. The memory 308 may contain one or more operating programs for directing the processor 306 for controlling the transceiver 304. The operating program may also control operation of the processor 306 for accepting from and presenting data to the user of the communication device 102 via the user interface 312.

In the example illustrated in FIG. 1, using the communication device 102, the user establishes a communication connection with the communication infrastructure 106. The service agent 212 in connection with operation of the processor 206 may formulate and send data corresponding to a service to be requested. It should be understood, while shown separately, the functionality of the service agent 212 need not be separate from the operating program directing operation of the processor 206. Consistent with the example of FIG. 1, the user 102 may be requesting a car service to dispatch a taxi or limousine. The service request is communicated by the communication network 108 to a service provider agent 110 via the communication network 108. The user 102 may be an existing user of the car service, and preference information about the user may be retained by the car service in the service provider agent database 112 for rendering services to the user 102. Alternatively, the user 102 may be new to the car service and may have to provide additional information to the car service as requested by the car service. Such requests for information are communicated by the service provider agent 110 via the communication network 108 and the communication infrastructure 106 to the communication device 102.

The communication device 102, through operation of the service agent 212, may permit the user to save contact information relating to the service provider, e.g., as an entry in an address book, as a bookmark on a web browser or through other suitable methods of saving information relating to the service provider within the communication unit 102. In those instances, the user may merely need to select the saved entry or bookmark to initiate in a single action the communication and to communicate the request for services.

The request for services transmitted by the communication device 102 may include, in addition to the request for service, information regarding the location of the communication device 102, desired type of service, the manner of payment to be employed and various other data associated with the rendering of services. Both the service request, location information and other service associated data may be retained within the service provider agent 110 and database 112.

In the ongoing example, the car service may be provided with information about the user of the communication device 102 or sufficient "look-up" information to determine the user's identity and preferences from stored information and the location of the user based upon the location of the communication device 102. The service provider agent may then dispatch the service provider 114 to the user's 102 location. For example, the service provider agent 110, based upon the service request, the user's location and the desired service may determine a nearest available service provider capable of responding to the service request and dispatch that service provider to the user's location.

Dispatching of the service provider 114 to the user's location is accomplished by establishing a communication connection between the service provider agent 110 and service provider 114 via the communication network 108, the communication infrastructure 106 and the air interface 116. Additionally, the service provider agent 110 may communicate information regarding the service unit 112 and other information regarding the rendering of the service to the user 102. Such information may include information to allow the user to identify the service provider 114, e.g., taxi or limousine number, license number, etc., once it arrives at the user's location, and may further provide instructions to the user 102. For example, if the user is being picked up at an airport, the instructions may inform the user, via the communication unit 102, to wait at a particular location of the airport or at a particular intersection to meet the service provider 114. This communication of information to the service provider 114 or the communication device 102 may be in the form of a token communicated to service provider 114 and/or the communication unit 102, respectively, and retained therein.

As described, each of the communication unit 102 and the service provider 114, via transceivers 204 and 304, respectively, have a proximity limited peer-to-peer communication capability and may communicate via the wireless interface 118. The proximity limited communication capability may be Bluetooth communication capability, 802.11x type communication capability, or other short range communication capability. When the service provider 114 is proximate the user's location, communication may be established between the service provider 114 and the communication unit 102 via the wireless interface 118. The user may be informed that the service provider 114 has arrived at the user's location or vice versa. Additionally, payment information, such as credit or debit card data, may be communicated by the user via the communication device 102 to the service provider 114. Such communication may be facilitated by operation of the service agent 212 and 312 in the communication device 102 and the service provider 114, respectively, or the functionality may otherwise be implemented. Encryption or other security measures may be taken to avoid unauthorized interception of these data communications. Additionally, the process may provide for an affirmative action by either or both of the user and service provider 114 to complete the transaction.

As described above, after receiving a request for a service, the service provider agent 112 may communicate to the communication unit 102 a token including information relating to the rendering of the service, such as the identity of the service provider 114. Once the service provider 114 is proximate the user, and upon establishment of the proximity limited peer-to-peer communication, the communication device 104 may communicate a token containing information for rendering the service, for example the destination where the user wants to be taken and payment information. Upon completion of the service the user may effect payment via the communication unit 102 by once again exchanging an information token confirming payment.

In accordance with the foregoing described embodiment, a user via a communication unit 102 may request services in a single action, or as necessary by providing various amounts of information. A service provider 114 is dispatched to the user's location based upon location information communicated by the communication device 102 during the request for service. Once the service provider 114 is proximate the user, transaction information may be communicated directly between the communication device 102 and the service provider 114, so that once the service is rendered, the user may be on his way without any delay, for example, waiting to conclude a payment transaction. The overall transaction time is reduced in that the request for services is facilitated, and may be accomplished in a single action, and the rendering of services and conclusion of the services transaction is facilitated by direct communication of the communication unit 102 and the service provider 114.

Figure 4:
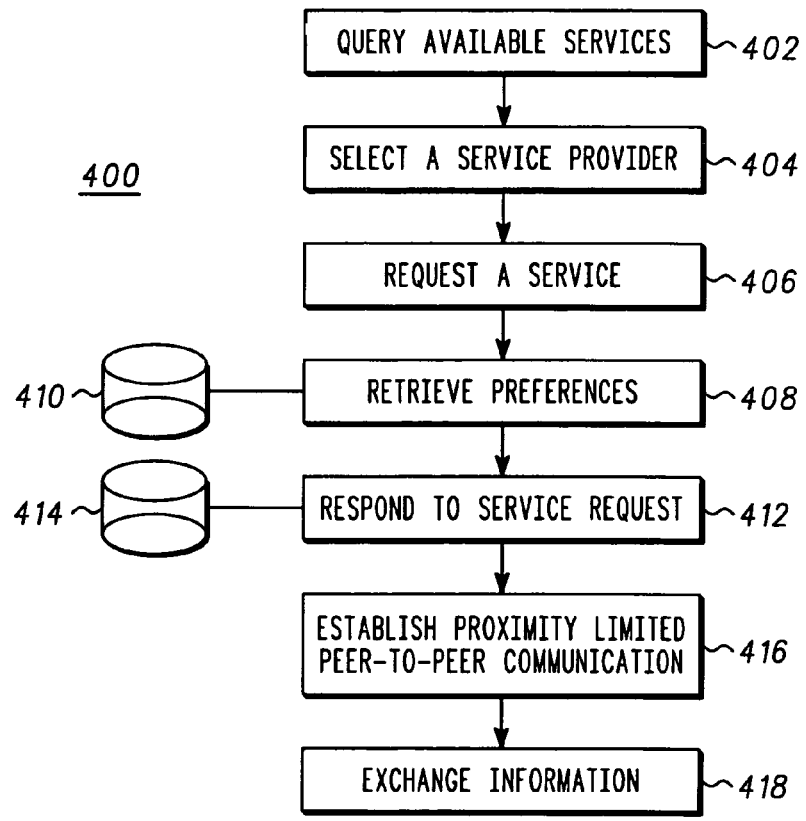
FIG. 4 is a flow chart illustrating a process for service rendering in accordance with a described embodiment.

The flowchart of FIG. 4 illustrates a process by which the system 100 may operate for facilitating requests for and rendering of services. The process begins at block 400 and at block 402 a user queries the system 100 for available services, e.g., taxi or limousine services. The query may be in the form of a search of the communication network for providers of the requested service, e.g., an Internet search, or may be a query of a list of service providers stored within the user's communication device, the communication infrastructure or the communication network. At block 404 the user selects a service provider from a list provided to the user responsive to the query. At block 406, a request for services, including at least location information, is communicated by the user, via the communication device, the communication infrastructure and the communication network, to a service provider agent coupled to the network. If the user has a profile with the service provider, at block 408 the user's preferences are retrieved from an associated database 410. At block 412, the service provider agent determines an appropriate response to the service request and prepares to communicate information, for example in the form of a token, to the user's communication device. For example, the service provider agent may refer to a database 414 containing the current locations and capabilities of service providers to determine a suitable service provider to dispatch to the user's location. The token is then communicated to the user's communication device informing the user of the service provider dispatched to respond to the service request and the service provider is dispatched. The service provider may receive dispatch information by communication of an information token.

Once the service provider and the communication device are proximate each other, whether the service provider has traveled to the communication unit, the communication unit has traveled to the service provider or the service provider, and the communication unit have modified their location in order to be proximate, at block 416 a proximity limited peer-to-peer communication is established. At block 418, the service provider and the user's communication device exchange information tokens confirming information relating to rendering the service, such as destination information and payment information via the proximity limited communication. Upon conclusion of the service, acknowledgement or confirmation of the service and payment is then exchanged, block 420.

This disclosure is intended to explain how to fashion and use various embodiments in accordance with the invention rather than to limit the true, intended, and fair scope thereof. The foregoing description is not intended to be exhaustive or to limit the invention to the precise form disclosed. Modifications or variations are possible in light of the above teachings. The embodiment(s) was chosen and described to illustrate of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

We claim:

1. A method of providing a service to a user of the service comprising the steps of:
    establishing a first communication connection, the first communication connection being between a user communication device and a service provider agent;
    requesting a service from the service provider agent via the first communication connection;
    providing location information identifying a location of the user to the service provider agent;
    dispatching a service provider to the location of the user communication device based upon the requested service and the location information;
    establishing a second communication connection, the second communication connection being a direct peer-to-peer communication connection between the user communication device and a communication device of the service provider; and
    completing a service transaction via the second communication connection upon rendering of the service at the location of the user by the service provider.

2. The method of claim 1, wherein the first communication connection comprises a wireless communication connection selected from the group of wireless communication connections comprising: a cellular radiotelephone communication connection, a paging communication connection and a wireless data communication connection.

3. The method of claim 1, wherein the step of providing location information comprises determining location information at the user communication device and communicating the location information to the service provider agent via the first communication link.

4. The method of claim 1, wherein the second communication connection is established relative to the proximity of user communication device and the communication device of the service provider.

5. The method of claim 1, wherein the second communication connection comprises a communication connection selected from the group of communication connections comprising a Bluetooth communication connection and an 802.11-type communication connection.

6. The method of claim 1, wherein the step of dispatching a service provider comprising obtaining service preference data for the user.

7. The method of claim 1, wherein the step of completing a service transaction comprises communicating an information token.

8. The method of claim 7, wherein the information token comprises service instructions.

9. The method of claim 7, wherein the information token comprises payment data.

10. The method of claim 1, wherein the step of requesting a service is affected in a single user action.

11. The method of claim 10, wherein the single user action comprises selection of a bookmark for establishing the first communication connection and requesting the service.

12. The method of claim 1, wherein the step of dispatching a service provider to the user comprises informing the user to transit to a location of the service provider.

13. A user communication device comprising:
    a processor coupled to a memory, the memory including a control program for controlling operation of the processor;
    a transceiver coupled to the processor, the transceiver being operable to establish a first communication connection with a service provider agent and a second communication connection with a service provider device; and
    a user interface coupled to the processor;
    wherein, the processor is operable responsive to an input at the user interface to cause the transceiver to communicate via the first communication connection a service request to the service provider agent, the service request including location information relating to the user communication device, and to communicate service transaction data directly with the service provider device, which is dispatched to a location of the user communication device responsive to the service request and the location information, via the second communication connection, which is a direct peer-to-peer communication connection between the user communication device and the service provider device, upon rendering of the requested service.

14. The user communication device of claim 13, wherein the location information comprises user communication device determined location data.

15. The user communication device of claim 13, wherein the service request comprise user service preference data.

16. The user communication device of claim 13, wherein the service request comprise user preference look-up data.

17. The user communication device of claim 13, wherein the first communication connection comprises a communication connection selected from the group of communication connections comprising a cellular radiotelephone communication connection, a paging communication connection and a wireless data communication connection.

18. The user communication device of claim 13, wherein the second communication connection is proximity limited.

19. The user communication device of claim 13, wherein the second communication connection comprises a communication connection selected from the group of communication connections comprising a Bluetooth communication connection and an 802.11-type communication connection.

20. The user communication device of claim 13, wherein the service transaction data comprises an information token.

21. The user communication device of claim 20, wherein the information token comprises data selected from the group of data comprising: service instruction data and service payment data.

22. The user communication device of claim 13, comprising a location detector coupled to the processor to provide the location information.

23. The user communication device of claim 13, wherein the processor is operable to affect the service request responsive to a single user action.

* * * * *